(12) United States Patent
Goudy et al.

(10) Patent No.: US 7,747,842 B1
(45) Date of Patent: Jun. 29, 2010

(54) CONFIGURABLE OUTPUT BUFFER GANGING FOR A PARALLEL PROCESSOR

(75) Inventors: Mark R. Goudy, Berkeley, CA (US); Andrew J. Tao, San Francisco, CA (US); Dominic Acocella, Blainville (CA)

(73) Assignee: NVIDIA Corporation, Santa Clara, CA (US)

( * ) Notice: Subject to any disclaimer, the term of this patent is extended or adjusted under 35 U.S.C. 154(b) by 1226 days.

(21) Appl. No.: 11/311,993

(22) Filed: Dec. 19, 2005

(51) Int. Cl.
*G06F 9/50* (2006.01)

(52) U.S. Cl. .................... 712/220; 712/222; 710/57

(58) Field of Classification Search .......... None
See application file for complete search history.

(56) References Cited

U.S. PATENT DOCUMENTS

| | | | |
|---|---|---|---|
| 6,304,887 B1 * | 10/2001 | Ju et al. .................. 708/404 |
| 6,947,047 B1 * | 9/2005 | Moy et al. ................ 345/501 |
| 7,098,922 B1 * | 8/2006 | Bastos et al. ............. 345/506 |
| 7,269,713 B2 * | 9/2007 | Anderson et al. .......... 712/214 |
| 7,418,576 B1 * | 8/2008 | Lindholm et al. .......... 712/214 |
| 7,640,284 B1 * | 12/2009 | Goodnight et al. ......... 708/404 |
| 2003/0177336 A1 * | 9/2003 | Smith ........................ 712/1 |
| 2004/0068730 A1 * | 4/2004 | Miller et al. .............. 718/106 |
| 2005/0076169 A1 * | 4/2005 | Modelski et al. .......... 710/100 |

\* cited by examiner

*Primary Examiner*—Eric Coleman
(74) *Attorney, Agent, or Firm*—Townsend and Townsend and Crew LLP (57) ABSTRACT

An output buffer in a multi-threaded processor is managed to store a variable amount of output data. Parallel threads produce a variable amount of output data. A controller is configured to determine how much output buffer space is needed per thread and how many threads can execute in parallel, given the available space in the output buffer. The controller also determines where each thread writes to in the output buffer.

19 Claims, 7 Drawing Sheets

CONFIGURABLE OUTPUT BUFFER GANGING FOR A PARALLEL PROCESSOR

BACKGROUND OF THE INVENTION

The present invention relates in general to parallel data processing, and in particular to managing state information for a multi-threaded processor.

Parallel processing techniques enhance throughput of a processor or multiprocessor system when multiple independent computations need to be performed. A computation can be divided into tasks, with each task being performed as a separate thread. (As used herein, a "thread" refers generally to an instance of execution of a particular program using particular input data.) Parallel threads are executed simultaneously using different processing engines.

Numerous existing processor architectures support parallel processing. The earliest such architectures used multiple discrete processors networked together. More recently, multiple processing cores have been fabricated on a single chip. These cores are controlled in various ways. In some instances, known as multiple-instruction, multiple data (MIMD) machines, each core independently fetches and issues its own instructions to its own processing engine (or engines). In other instances, known as single-instruction, multiple-data (SIMD) machines, a core has a single instruction unit that issues the same instruction in parallel to multiple processing engines, which execute the instruction on different input operands. SIMD machines generally have advantages in chip area (since only one instruction unit is needed) and therefore cost; the downside is that parallelism is only available to the extent that multiple instances of the same instruction can be executed concurrently.

Graphics processors have used very wide SIMD architectures to achieve high throughput in image-rendering applications. Such applications generally entail executing the same programs (vertex shaders or pixel shaders) on large numbers of objects (vertices or primitives). Since each object is processed independently of all others using the same sequence of operations, a SIMD architecture provides considerable performance enhancement at reasonable cost. Typically, a GPU includes one SIMD core (e.g., 200 threads wide) that executes vertex shader programs, and another SIMD core of comparable size that executes pixel shader programs. In high-end GPUs, multiple sets of SIMD cores are sometimes provided to support an even higher degree of parallelism.

In some instances, parallel threads produce variable amounts of output data. With these parallel threads, an on-chip buffer must be large enough to hold the maximum amount of data that can be produced. Where the maximum amount is very large, a suitably large on-chip buffer is expensive. Therefore, it is desirable to provide a more area-efficient output buffer to manage a variable amount of output data.

BRIEF SUMMARY OF THE INVENTION

Embodiments of the present invention facilitate managing a variable amount of output data in an output buffer of a multi-threaded processor. In one embodiment, parallel threads produce a variable amount of output data. A controller is configured to determine how much output buffer space is needed per thread and how many threads can execute in parallel, given the available space in the output buffer. The controller also determines where each thread writes to in the output buffer.

In one embodiment of the present invention, a multi-threaded processor includes a core, an output buffer, and a controller. The core is configured to execute up to a maximum number (P) of threads in parallel and to write output data to the output buffer. Each thread produces up to an upper limit ($W_{max}$) of output data words. The output buffer, which has a total capacity of a number (C) of words, receives output data words from the core. Total capacity C is less than the product of $P*W_{max}$. The controller is configured to determine, based on an implemented maximum number ($W_{act}$) of output data words per thread, a number ($N_T$) of threads to be executed in parallel by the core. The product of $N_T*W_{act}$ is less than or equal to C.

According to another embodiment of the present invention, a method for processing data includes receiving a number of threads to be executed. Each thread, when executed, produces a variable number up to an upper limit ($W_{max}$) of output data words. The method further includes determining an implemented maximum ($W_{act}$) number of words expected per thread, determining a number ($N_T$) to be executed in parallel such that an output buffer has enough space to store all of the output data words, executing the number $N_T$ of threads in parallel, and loading the output data produced by each thread into the output buffer such that all of the output data words are stored in the output buffer.

The following detailed description together with the accompanying drawings will provide a better understanding of the nature and advantages of the present invention.

DETAILED DESCRIPTION OF THE INVENTION

Embodiments of the present invention facilitate managing a variable amount of output data in an output buffer of a multi-threaded processor. In one embodiment, parallel threads produce a variable amount of output data. A controller is configured to determine how much output buffer space is needed per thread and how many threads can execute in parallel, given the available space in the output buffer. The controller also determines where each thread writes to in the output buffer.

System Overview

Figure 1:
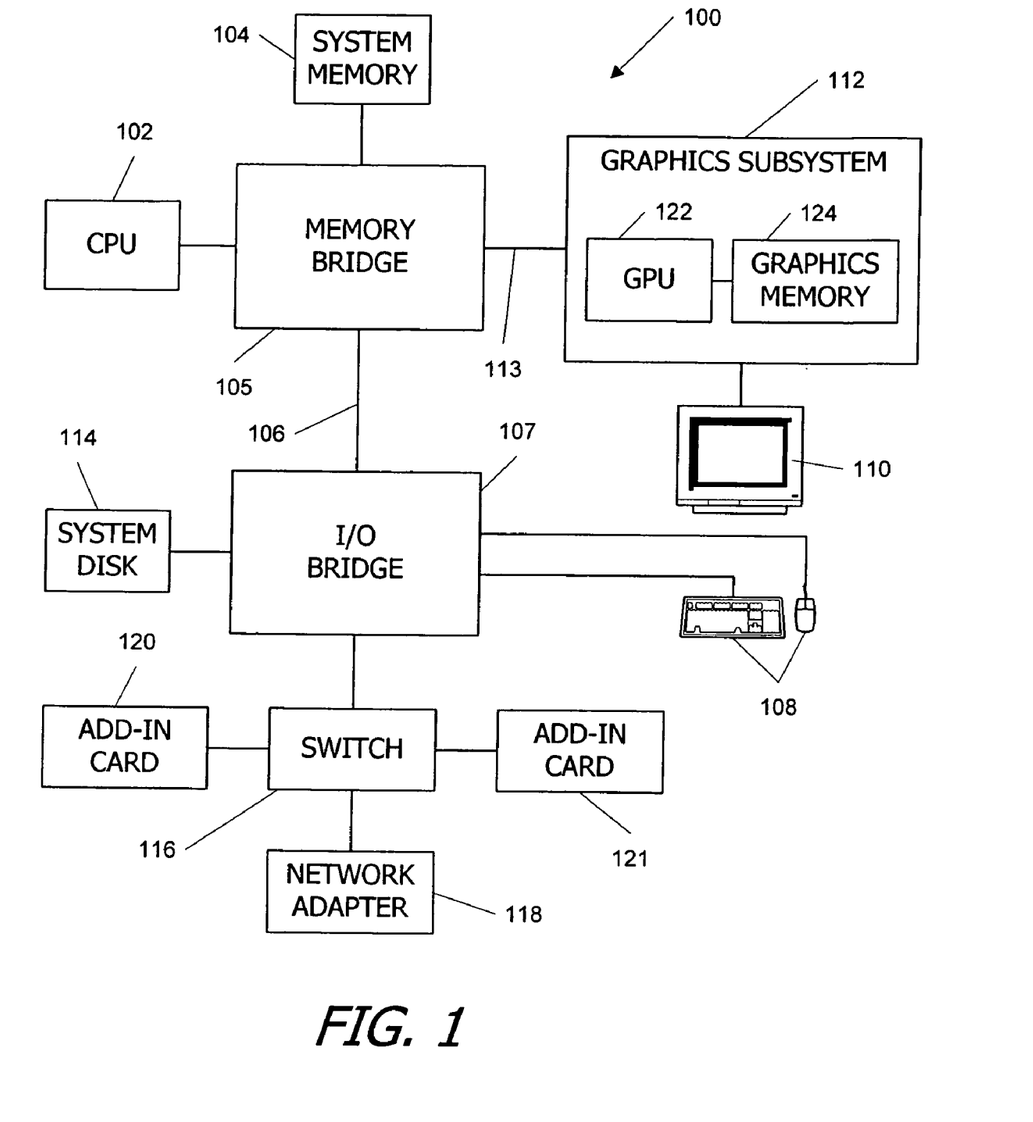
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to I/O bridge 107 via a bus 113. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Accelerated Graphics Port), HyperTransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, little or no dedicated graphics memory is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
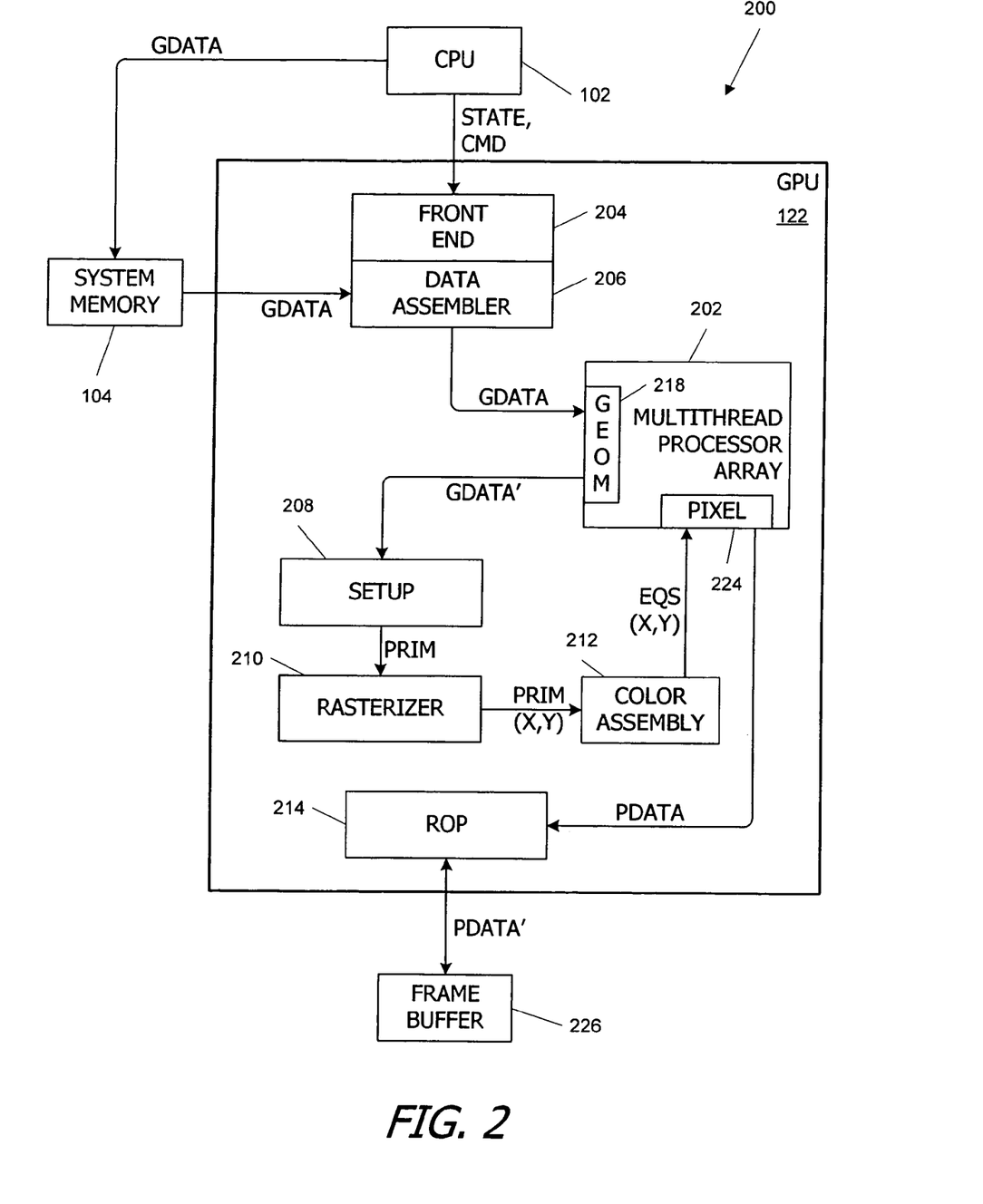
FIG. 2 is a block diagram of a rendering pipeline that can be implemented in the GPU of FIG. 1 according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operate as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a vertex shader program to interpolate a value for the attribute at any location within the primitive; conventional techniques can be used to generate the equations. For instance, in one embodiment, color assembly module 212 generates coefficients A, B and C for a plane equation of the form $U=Ax+By+C$ for each attribute U.

Color assembly module 212 provides the attribute equations (EQS, which may be e.g., the plane-equation coefficients A, B and C) for each primitive that covers at least one pixel and a list of screen coordinates (X,Y) of the covered pixels to a pixel module 224 in multithreaded core array 202.

Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operate as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Multithreaded Core Array Configuration

Figure 3:
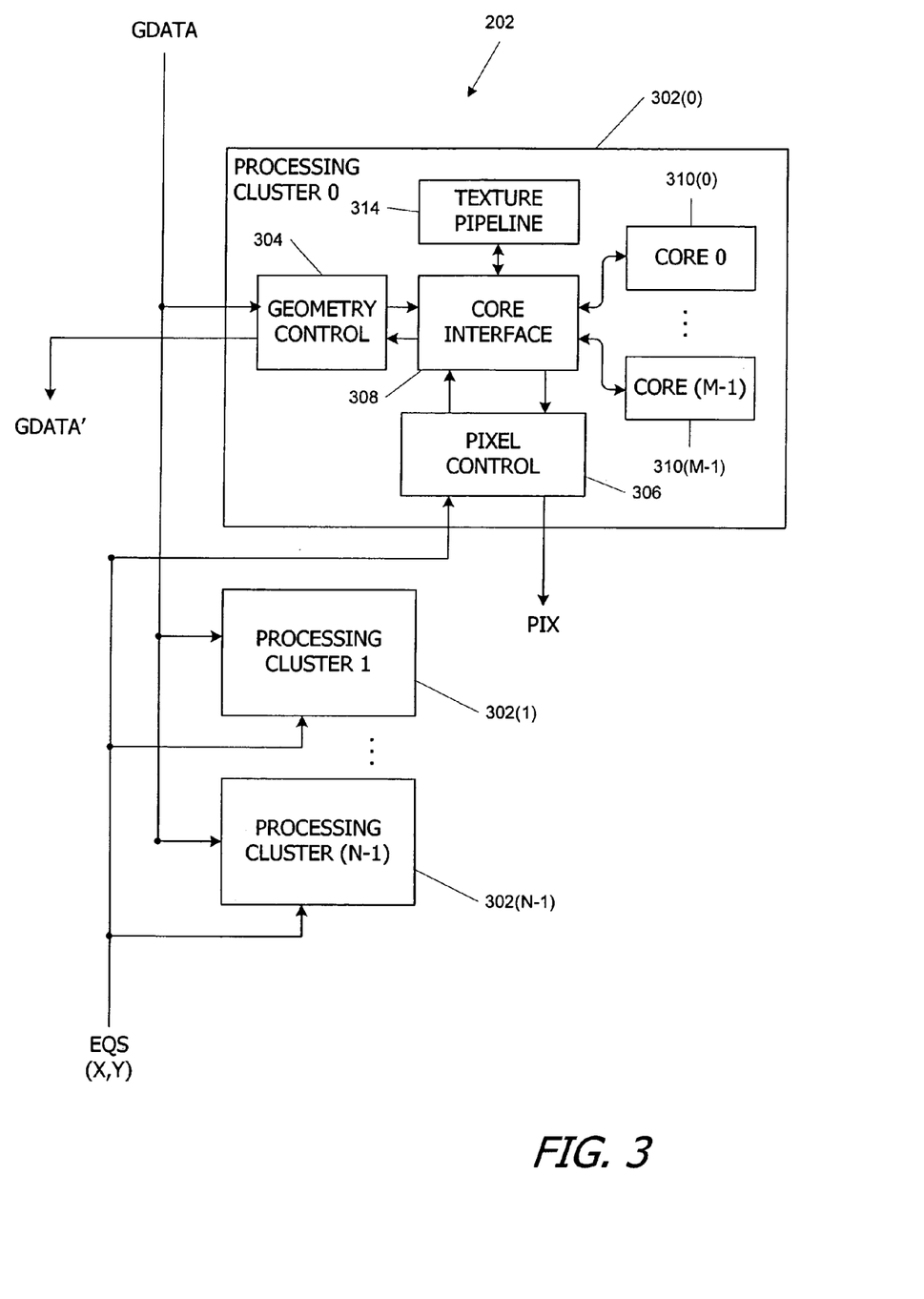
FIG. 3 is a block diagram of a multithreaded processor array according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. An example architecture for a representative core 310 is described below with reference to FIG. 4.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(o) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Core Architecture

Figure 4:
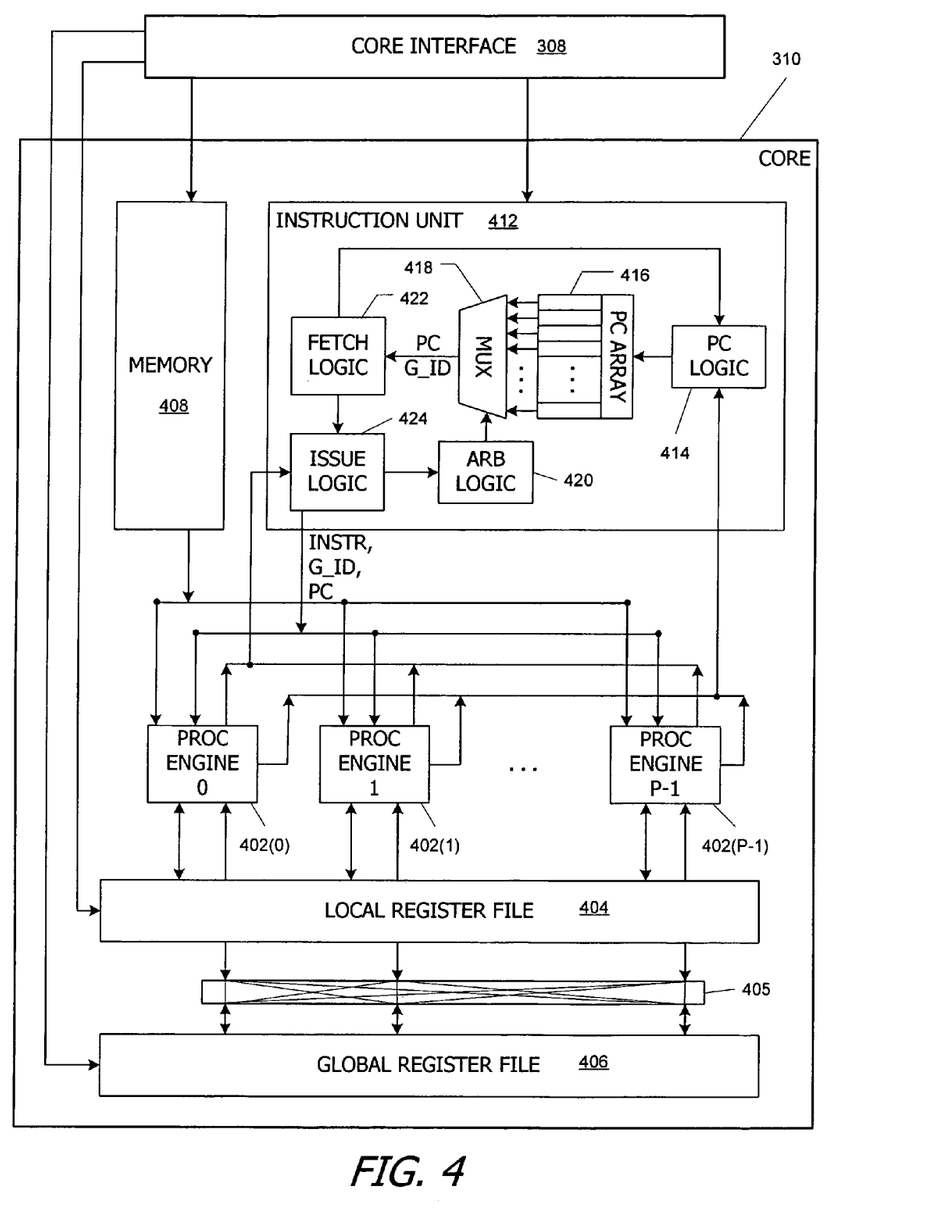
FIG. 4 is a block diagram of a core according to an embodiment of the present invention.

FIG. 4 is a block diagram of a core 310 according to an embodiment of the present invention. Core 310 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units.

In one embodiment, core 310 includes an array of P (e.g., 16) parallel processing engines 402 configured to receive SIMD instructions from a single instruction unit 412. Each parallel processing engine 402 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 402 is allocated space in a local register file 404 for storing its local input data, intermediate results, and the like. In one embodiment, local register file 404 is physically or logically divided into P lanes, each having some number of entries (where each entry might be, e.g., a 32-bit word). One lane is allocated to each processing unit, and corresponding entries in different lanes can be populated with data for corresponding thread types to facilitate SIMD execution. The number of entries in local register file 404 is advantageously large enough to support multiple concurrent threads per processing engine 402.

Each processing engine 402 also has access, via a crossbar switch 405, to a global register file 406 that is shared among all of the processing engines 402 in core 310. Global register file 406 may be as large as desired, and in some embodiments, any processing engine 402 can read to or write from any location in global register file 406. In addition to global register file 406, some embodiments also provide an on-chip shared memory 408, which may be implemented, e.g., as a conventional RAM. On-chip memory 408 is advantageously used to store data that is expected to be used in multiple threads, such as coefficients of attribute equations, which are usable in pixel shader programs. In some embodiments, processing engines 402 may also have access to additional off-chip shared memory (not shown), which might be located, e.g., within graphics memory 124 of FIG. 1.

In one embodiment, each processing engine 402 is multithreaded and can execute up to some number G (e.g., 24) of threads concurrently, e.g., by maintaining current state information associated with each thread in a different portion of its allocated lane in local register file 404. Processing engines 402 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

Instruction unit 412 is configured such that, for any given processing cycle, the same instruction (INSTR) is issued to all P processing engines 402. Thus, at the level of a single clock cycle, core 310 implements a P-way SIMD microarchitecture. Since each processing engine 402 is also multi-threaded, supporting up to G threads, core 310 in this embodiment can have up to P*G threads in flight concurrently. For instance, if P=16 and G=24, then core 310 supports up to 384 concurrent threads.

Because instruction unit 412 issues the same instruction to all P processing engines 402 in parallel, core 310 is advantageously used to process threads in "SIMD groups." As used herein, a "SIMD group" refers to a group of up to P threads of execution of the same program on different input data, with one thread of the group being assigned to each processing engine 402. For example, a SIMD group might consist of P vertices, each being processed using the same vertex shader program. (A SIMD group may include fewer than P threads, in which case some of processing engines 402 will be idle during cycles when that SIMD group is being processed.) Since each processing engine 402 can support up to G threads, it follows that up to G SIMD groups can be in flight in core 310 at any given time.

On each clock cycle, one instruction is issued to all P threads making up a selected one of the G SIMD groups. To indicate which thread is currently active, a "group index" (GID) for the associated thread may be included with the instruction. Processing engine 402 uses group index GID as a context identifier, e.g., to determine which portion of its allocated lane in local register file 404 should be used when executing the instruction. Thus, in a given cycle, all processing engines 402 in core 310 are nominally executing the same instruction for different threads in the same group.

Instruction unit 412 includes program counter (PC) logic 414, a program counter register array 416, a multiplexer 418, arbitration logic 420, fetch logic 422, and issue logic 424. Program counter register array 416 stores G program counter values (one per SIMD group), which are updated independently of each other by PC logic 414. PC logic 414 updates the PC values based on information received from processing engines 402 and/or fetch logic 422. PC logic 414 is advantageously configured to track divergence among threads in a SIMD group and to select instructions in a way that ultimately results in the threads resynchronizing.

Fetch logic 422, which may be of generally conventional design, is configured to fetch an instruction corresponding to a program counter value PC from an instruction store (not shown) and to provide the fetched instructions to issue logic 424. In some embodiments, fetch logic 422 (or issue logic 424) may also include decoding logic that converts the instructions into a format recognizable by processing engines 402.

Arbitration logic 420 and multiplexer 418 determine the order in which instructions are fetched. More specifically, on each clock cycle, arbitration logic 420 selects one of the G possible group indices GID as the SIMD group for which a next instruction should be fetched and supplies a corresponding control signal to multiplexer 418, which selects the corresponding PC. Arbitration logic 420 may include conventional logic for prioritizing and selecting among concurrent threads (e.g., using round-robin, least-recently serviced, or the like), and selection may be based in part on feedback information from fetch logic 422 or issue logic 424 as to how many instructions have been fetched but not yet issued for each SIMD group.

Fetch logic 422 provides the fetched instructions, together with the group index GID and program counter value PC, to issue logic 424. In some embodiments, issue logic 424 maintains a queue of fetched instructions for each in-flight SIMD group. Issue logic 424, which may be of generally conventional design, receives status information from processing engines 402 indicating which SIMD groups are ready to execute a next instruction. Based on this information, issue logic 424 selects a next instruction to issue and issues the selected instruction, together with the associated PC value and GID. Each processing engine 402 either executes or ignores the instruction, depending on whether the PC value corresponds to the next instruction in its thread associated with group index GID.

In one embodiment, instructions within a SIMD group are issued in order relative to each other, but the next instruction to be issued can be associated with any one of the SIMD groups. For instance, if in the context of one SIMD group, one or more processing engines 402 are waiting for a response from other system components (e.g., off-chip memory or texture pipeline 314 of FIG. 3), issue logic 424 advantageously selects a group index GID corresponding to a different SIMD group.

For optimal performance, all threads within a SIMD group are advantageously launched on the same clock cycle so that they begin in a synchronized state. In one embodiment, core interface 308 advantageously loads a SIMD group into core 310, then instructs core 310 to launch the group. "Loading" a group includes supplying instruction unit 412 and processing engines 402 with input data and other parameters required to execute the applicable program. For example, in the case of vertex processing, core interface 308 loads the starting PC value for the vertex shader program into a slot in PC array 416 that is not currently in use; this slot corresponds to the group index GID assigned to the new SIMD group that will process vertex threads. Core interface 308 allocates sufficient space for an input buffer (e.g., in global register file 406 or local register file 404) for each processing engine 402 to execute one vertex thread, then loads the vertex data. In one embodiment, all data for the first vertex in the group is loaded into a lane of the input buffer allocated to processing engine 402(0), all data for the second vertex is in a lane of the input buffer allocated to processing engine 402(1), and so on. In some embodiments, data for multiple vertices in the group can be loaded in parallel, as described below.

Once all the data for the group has been loaded, core interface 308 launches the SIMD group by signaling to instruction unit 412 to begin fetching and issuing instructions corresponding to the group index GID of the new group. SIMD groups for geometry and pixel threads can be loaded and launched in a similar fashion. Examples of loading and launching logic for various types of threads are described below.

It should be noted that although all threads within a group are executing the same program and are initially synchronized with each other, the execution paths of different threads in the group might diverge during the course of program execution. Instruction unit 412 advantageously manages instruction fetch and issue for each SIMD group so as to ensure that threads in a group that have diverged eventually resynchronize. For instance, in one embodiment, instruction unit 412 maintains a branch token stack for each SIMD group. If a branch is taken by some threads in a SIMD group ("taken threads") but not by others ("not-taken threads"), a token is pushed onto the SIMD group's branch token stack. The token includes a mask identifying the not-taken threads. Instruction unit 412 continues to fetch instructions for the taken threads; these instructions are issued to all processing engines 402 with an active mask set such that the instructions are executed for the taken threads but not for the not-taken threads. Execution of the taken threads continues until a point in the instruction stream at which the branch-taken path and the branch-not-taken path merge. The merge point can be identified, e.g., by a flag or other indicator associated with the instruction where the merge occurs.

Once the merge point is reached, instruction unit 412 pops the token off the branch token stack and begins fetching instructions for the not-taken threads; these instructions are issued to all processing engines 402 with the active mask set such that the instructions are executed for not-taken threads but not for taken threads. Execution of the not-taken threads continues until the merge point is reached. Thereafter, the taken and not-taken active masks are merged into a single active mask, and fetching and executing continues.

It will be appreciated that the streaming multiprocessor architecture described herein is illustrative and that variations and modifications are possible. Any number of processing units may be included. In some embodiments, each processing unit has its own local register file, and the allocation of local register file entries per thread can be fixed or configurable as desired.

In some embodiments, core 310 is operated at a higher clock rate than core interface 308, allowing the streaming processor to process more data using less hardware in a given amount of time. For instance, core 310 can be operated at a clock rate that is twice the clock rate of core interface 308. If core 310 includes P processing engines 402 producing data at twice the core interface clock rate, then core 310 can produce 2*P results per core interface clock. Provided there is sufficient space in local register file 404, from the perspective of core interface 308, the situation is effectively identical to a core with 2*P processing units. Thus, P-way SIMD parallelism could be produced either by including P processing units in core 310 and operating core 310 at the same clock rate as core interface 308 or by including P/2 processing units in core 310 and operating core 310 at twice the clock rate of core interface 308. Other timing variations are also possible.

In another alternative embodiment, SIMD groups containing more than P threads ("supergroups") can be defined. A supergroup is defined by associating the group index values of two (or more) of the SIMD groups (e.g., GID1 and GID2) with each other. When issue logic 424 selects a supergroup, it issues the same instruction twice on two successive cycles: on one cycle, the instruction is issued for GID1, and on the next cycle, the same instruction is issued for GID2. Thus, the supergroup is in effect a SIMD group. Supergroups can be used to reduce the number of distinct program counters, state definitions, and other per-group parameters that need to be maintained without reducing the number of concurrent threads.

Geometry Shader Output Buffer

Referring back to FIG. 3, geometry module 304 directs programmable processing engines 402 (see FIG. 4) in one or more cores 310 to execute vertex and/or geometry shader programs on vertex data. As previously discussed, geometry shader programs differ from vertex shader programs in that geometry shader programs operate on primitives (groups of vertices) rather than individual vertices. In some instances, a geometry program may create new vertices or primitives and/or remove vertices or primitives from the set of objects being processed.

Figure 5:
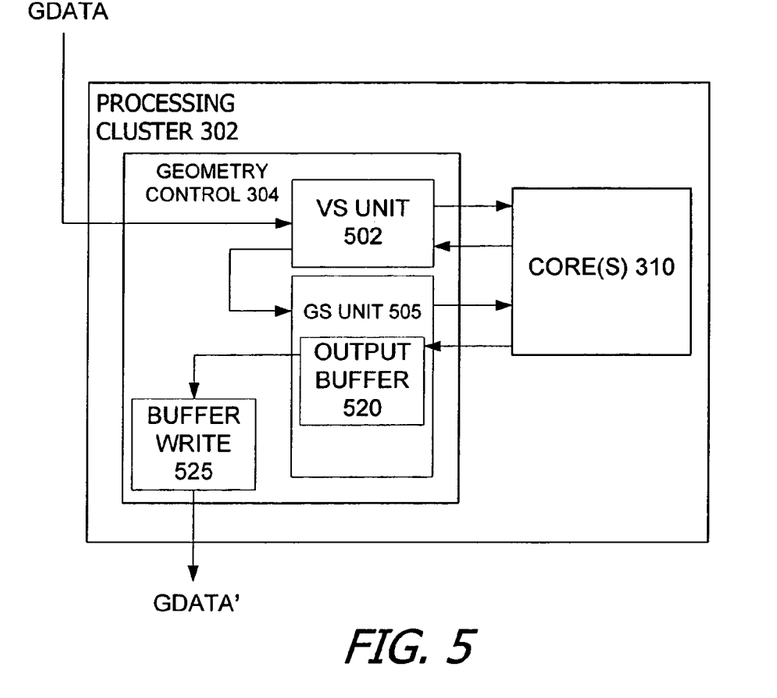
FIG. 5 is a simplified block diagram of a processing cluster configured to execute geometry shader (GS) threads according to an embodiment of the present invention.

FIG. 5 is a simplified block diagram of a processing cluster 302, illustrating features relevant to vertex shader and geometry shader execution. Processing cluster 302 contains a geometry controller 304, a vertex shader (VS) unit 502, a geometry shader (GS) unit 505, one or more cores 310, an output buffer 520, and a buffer write module 525. Geometry data (GDATA) is input to a vertex unit 502. VS unit 502 performs the loading and launching of vertex shader (VS) threads to be executed by core(s) 310.

In one embodiment, the vertex shader program includes instructions to core(s) 310 to transfer the processed vertex data to a VS output buffer (not shown) in VS unit 502. Data in the VS output buffer is made available to GS unit 505 located in geometry controller 304. In some embodiments of the present invention, the input to each geometry shader (GS) thread is a primitive, represented as an ordered list of vertices with their various attributes. Vertex data that has already been processed by a vertex shader program is advantageously used. As is known in the art, one vertex may be included in multiple primitives; accordingly, it is desirable to provide a pool of vertices that can be accessed by multiple GS threads. GS unit 505 is advantageously designed to manage a vertex pool (also referred to herein as a geometry buffer) and to provide pointers to locations in the vertex pool as the input data for each GS thread. A geometry buffer to be used by GS threads may be allocated during system startup (or application startup) in any core 310 that is to execute GS threads and may remain allocated, e.g., for the duration of an application.

Geometry shader programs are executed by core(s) 310. Each geometry shader thread produces one or more primitives as output. Geometry shader threads advantageously write their output data to a GS output buffer 520 in geometry controller 304. Output data includes vertices for one or more primitives. Each vertex has various attributes, and each word of output data corresponds to one or more attributes of a vertex. The output data may be received in parallel or sequentially. In one embodiment, words from different threads are received in parallel and each thread may provide any number of output data words.

Buffer write unit 525 in geometry controller 304 delivers the resulting primitives as processed geometry data (GDATA') from the GS output buffer 520 to setup module 208 shown in FIG. 2.

In some embodiments, GS output buffer 520 limits the number of words of output data that a GS thread can produce. In one embodiment, core(s) 310 are configured to execute up to a maximum number (P) of GS threads in parallel, e.g., in SIMD groups as described above with reference to FIG. 4. Each GS thread may produce any number up to an upper limit ($W_{max}$), of output data words. Therefore, the total number of output data words generated per group of threads is the product $P*W_{max}$. Assume that output buffer 520 has a total capacity of C words. If $C \geq P*W_{max}$, then the output buffer is capable of storing the entire GS output load. However, if $C < P*W_{max}$, then problems in storing GS output data may arise due to the limited capacity of the output buffer.

In one embodiment of the present invention, the upper limit ($W_{max}$) on the number of output data words per thread is 1024, in accordance with the forthcoming DX10 graphics API (application program interface) by Microsoft Corp. In one embodiment, output buffer 520 stores up to 1024 output data words, and the number of GS threads executed in parallel is reduced as needed to produce sufficient space in output buffer 520 to store all of the output data for a particular group of parallel threads.

Configurable Bank Allocation

Figure 6:
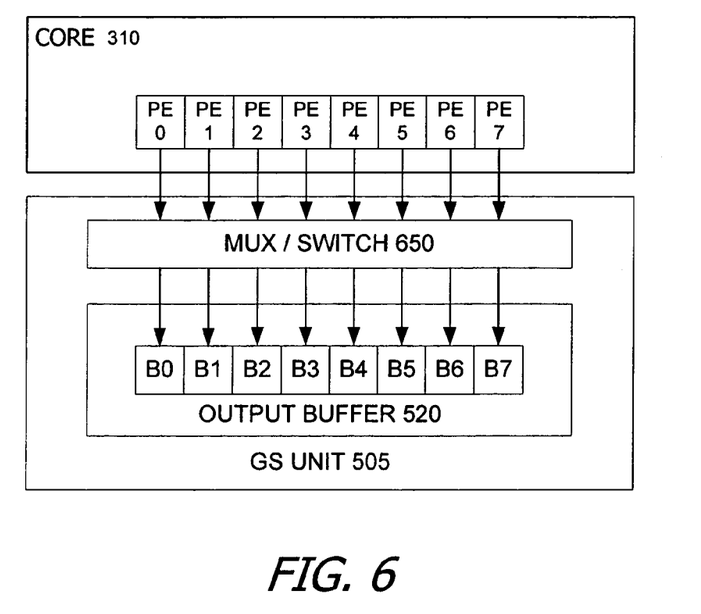
FIG. 6 is a block diagram of a configurable output path from a processing core to a geometry controller according to an embodiment of the present invention.

FIG. 6 is a block diagram of a configurable output path from a processing core to a geometry controller according to an embodiment of the present invention. In this embodiment, core 310 includes processing engines PE0-PE7 that provide output data to GS unit 505. Multiplexer/switch 650 directs the output data to banks B0-B7 within output buffer 520. As used herein, "bank" refers generally to any memory circuit with multiple storage locations ("entries") sharing a read and/or write port. Data words can be written to each bank in parallel.

Core 310 is configured to execute up to P threads in parallel. In one embodiment, P=8; for instance, each processing engine PE0-PE7 might execute one thread of a SIMD group.

Output buffer 520 within GS unit 505 has a total capacity of C words distributed across a number B of banks. In one embodiment, capacity C=1024 words (in accordance with DX10 requirements) and B=8; each bank can store up to 128 output data words.

It is desirable to configure output buffer 520 such that all of the output data from GS threads can be written to GS output buffer 520. In one embodiment, multiplexer/switch 650 configurably connects processing engines PE0-PE7 to one or more banks B0-B7 of output buffer 520. Multiplexer/switch 650 can gang together two or more banks to receive data from one thread.

For DX10 applications, each thread can produce up to an upper limit $W_{max}$=1024 output data words. If processing engines PE0-PE7 are configured to execute up to P=8 threads in parallel, the total number of output data words that can be generated is $P*W_{max}$=8*1024=8192 output data words. Where $C<P*W_{max}$ (e.g., where C=1024), the number of GS threads that execute in parallel is reduced so that all the data will fit into GS output buffer 520, and multiple banks are allocated to each thread. In one embodiment, multiplexer/switch 650 allocates banks B0-B7 and GS unit 505 controls the number of threads that execute in parallel.

In some applications, the upper limit $W_{max}$ is never reached. In some embodiments, it is known that each thread will produce fewer than $W_{max}$ output data words. For instance, GS unit 505 may receive configuration information indicating the implemented maximum number of data words ($W_{act}$) that a thread actually produces. As used herein, the actual implemented maximum number of output data words produced by each thread is $W_{act}$, where $W_{act}$ may be less than or equal to $W_{max}$.

In one case, if it is known that each thread will not produce more than 128 output data words (i.e., $W_{act}$=128), then eight threads may be executed in parallel (e.g., bank B0 stores output data for one thread, bank B1 stores output data for another thread, and so on). In another case, if each thread might produce up to 1024 output data words (i.e., $W_{act}$=1024), then one thread is executed at a time, and all eight banks are allocated to store output data for that thread.

Determining Bank Allocation

Figure 7:
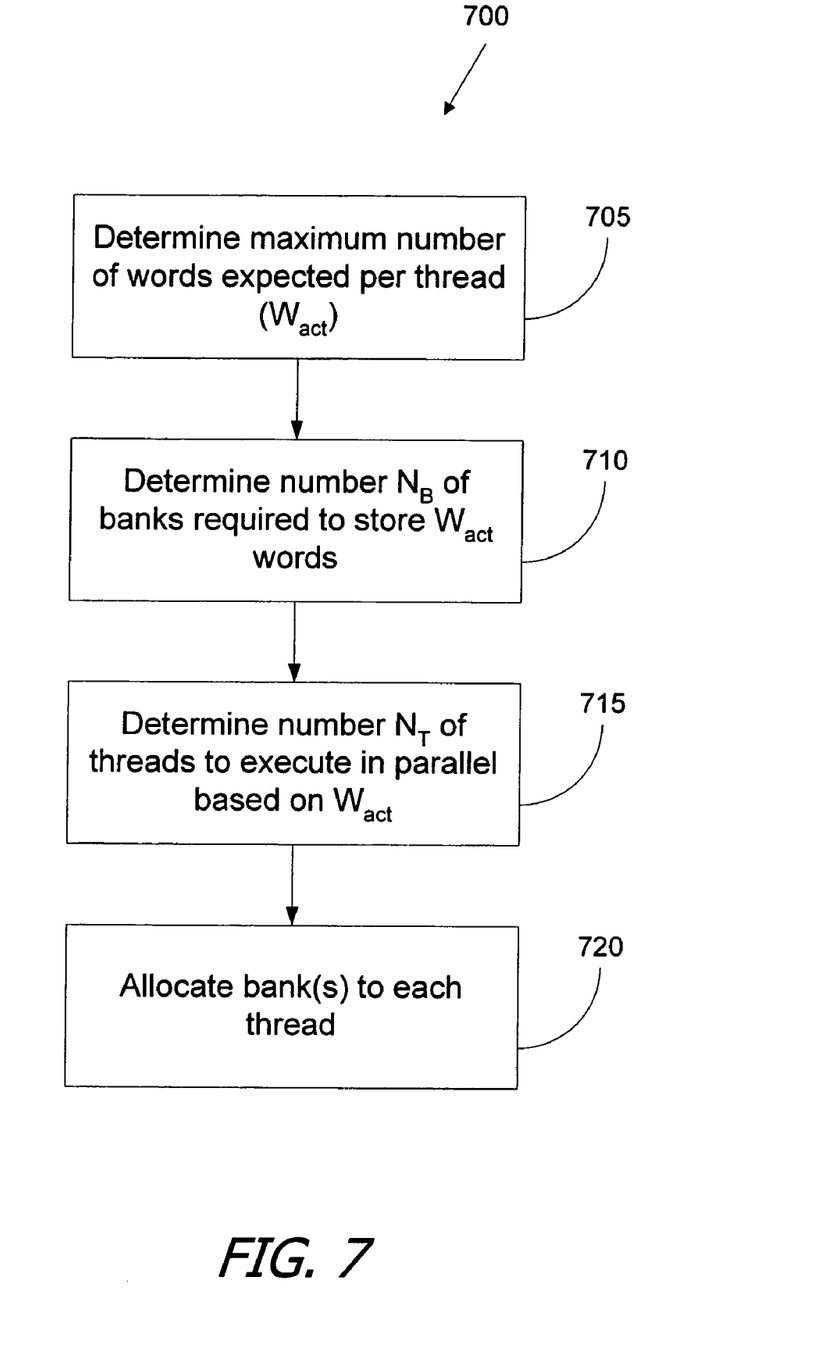
FIG. 7 is a flowchart illustrating a process for determining bank allocation for storing output data words according to an embodiment of the present invention.

FIG. 7 is a flowchart illustrating a process 700 for determining bank allocation for storing output data words according to an embodiment of the present invention. Process 700 can be executed by geometry controller 304 of FIG. 5. At step 705, an implemented maximum number ($W_{act}$) of words expected per thread is determined. This value $W_{act}$ may be determined based on the state information applicable to GS threads, which can be provided to geometry controller 304 using conventional techniques. In one embodiment, the maximum number of vertices ($N_v$) to be stored and the number of attributes per vertex ($N_a$) are provided to geometry controller 304. Geometry controller 304 computes the product $N_v*N_a=W_{act}$, i.e., the maximum space needed for each GS thread. As mentioned above, $W_{act}$ is less than or equal to $W_{max}$, where $W_{max}$ corresponds to an upper limit of output data words that each thread might produce.

At step 710, the number ($N_B$) of banks required to store $W_{act}$ words is determined. In one embodiment, $N_B$ is found by the formula:

$$N_B = \frac{W_{act}}{C_B},$$

where $C_B$ is the capacity of one bank of output buffer 520. In some embodiments, $N_B$ is rounded up to the next whole number or to the next power of 2. At step 715, a number ($N_T$) of threads to be executed in parallel is determined based on $W_{act}$ such that $N_T*W_{act} \leq C$, where C is the total capacity of output buffer 520. In other embodiments, $N_T$ is found by the formula:

$$N_T = \frac{B}{N_B},$$

where $N_T$ is rounded down to a whole number. At step 720, the bank(s) are allocated so that the number $N_T$ of threads can be processed in parallel.

In an alternative embodiment, the number $N_T$ of threads to execute in parallel is determined by identifying the largest integer or largest power of 2 for which $N_T*W_{act} \leq C$, and the number $N_B$ of banks to be allocated to each thread is determined by dividing the total number (B) of banks by $N_T$.

FIGS. 8A-8D illustrate bank configurations for output buffer 520 of FIG. 6 that can be implemented at step 720 of process 700 for various values of $W_{act}$. In these examples, output buffer 520 has 8 banks and total capacity C of 1024 words.

Figure 8A:
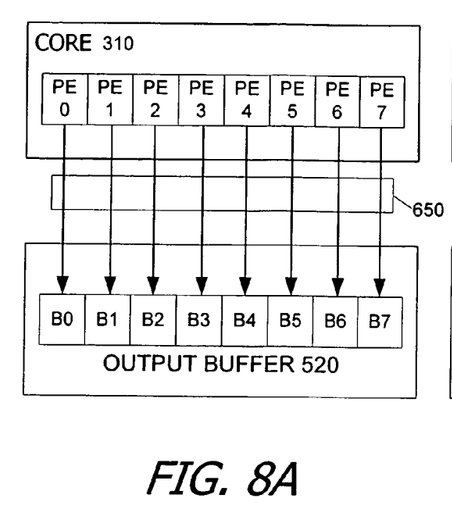
FIGS. 8A-8D are block diagrams illustrating different configurations of the output path of FIG. 6.

FIG. 8A illustrates a bank configuration that can be used for $W_{act} \leq 128$. Multiplexer/switch 650 is configured to deliver output data from each processing engine PE0-PE7 to a different one of banks B0-B7. Eight threads can execute in parallel.

Figure 8B:
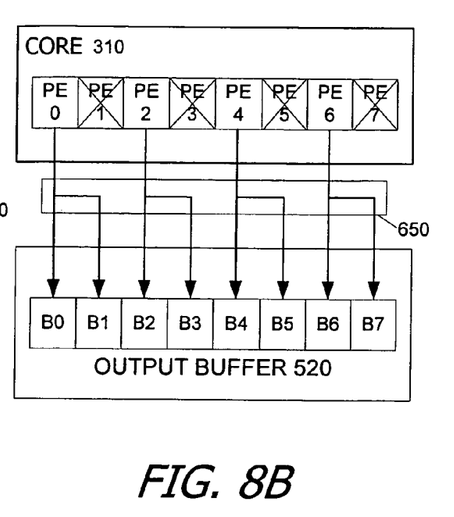

FIG. 8B illustrates a bank configuration that can be used for $128<W_{act} \leq 256$. In this case, each thread requires more than one bank but not more than two banks to store its output data. Accordingly, the number of threads $N_T$ is reduced to 4. It should be appreciated that the four threads to be processed in parallel may be executed in any four processing engines within core 310. In this example, threads execute on processing engines PE0, PE2, PE4, and PE6, while processing engines PE1, PE3, PE5, and PE7 are idle. Multiplexer/switch 650 is configured to deliver output data from each thread to 2 banks. Processing engine PE0 delivers output data to banks B0 and B1, processing engine PE2 delivers output data to banks B2 and B3, and so on. In one embodiment, multiplexer/switch 650 directs output data from processing engine PE0 to bank B0 until bank B0 is filled, then directs any remaining output data from processing engine PE0 to bank B1.

Figure 8C:
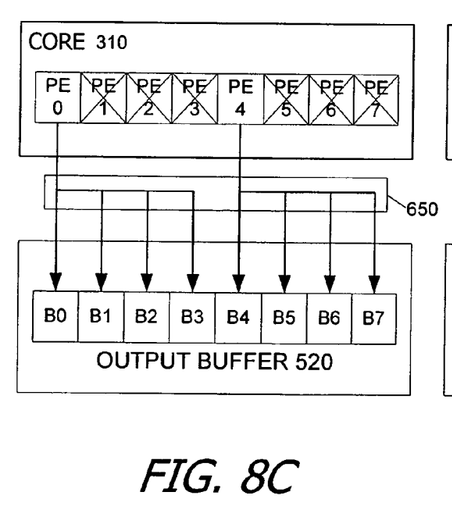

FIG. 8C illustrates a bank configuration that can be used for $256<W_{act} \leq 512$. In this case, each thread requires more than two banks but not more than four banks to store its output data. Accordingly, the number of threads $N_T$ is reduced to 2. It should be appreciated that the two threads to be processed in parallel may be executed in any two processing engines within core 310. In this example, threads execute on processing engines PE0 and PE4, while processing engines PE1-PE3 and PE5-PE7 are idle. Multiplexer/switch 650 is configured to deliver output data from each thread to 4 banks. Processing engine PE0 delivers output data to banks B0-B3, and processing engine PE4 delivers output data to banks B4-B7.

Figure 8D:
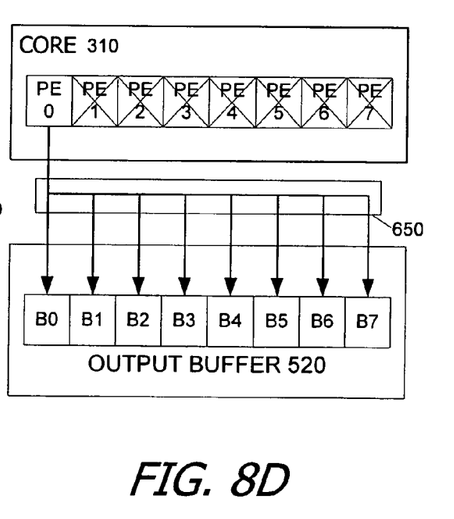

FIG. 8D illustrates a bank configuration that can be used for $512 < W_{act} \leq 1024$. In this case, each thread requires more than four banks but not more than all eight banks to store its output data. Accordingly, the number of threads is $N_T$ is reduced to 1. It should be appreciated that the one thread to be processed in parallel may be executed in any processing engine within core 310. In this example, one thread executes on processing engine PE0, while processing engines PE1-PE7 are idle. Multiplexer/switch 650 is configured to deliver output data from each thread to one bank. Processing engine PE0 delivers output data to banks B0-B7.

Table 1 summarizes these possible allocations:

TABLE 1

| $W_{act}$ (words) | Bank Allocation |
|---|---|
| $W_{act} \leq 128$ | 1 bank/thread |
| $128 < W_{act} \leq 256$ | 2 banks/thread |
| $256 < W_{act} \leq 512$ | 4 banks/thread |
| $512 < W_{act} \leq 1024$ | 8 banks/thread |

In these embodiments, one or more GS threads can be processed in parallel depending on the amount of output data expected from each thread. Geometry controller 304 is configured to handle any number of primitives that may be produced as a result of one primitive being input to the geometry shader module of a processing cluster.

It is to be understood that the above description is intended to be illustrative and not restrictive. Many embodiments will be apparent to those of skill in the art upon reviewing the above description. For example, the present invention is not limited to GS threads. The present invention may be used when a variable amount of data is produced per thread and an upper limit is known for a particular group of threads.

The buffer sizes, number of threads, bank allocations, etc. are illustrative and not limiting. In addition, a "word" can be any convenient size (e.g., the number of bits that can be written in parallel to a single bank). In some embodiments, 1 word=32 bits, but this could be modified (e.g., 1 word=64 bits).

It should also be appreciated that the configuration parameters $N_T$ and $N_B$ may be determined by a driver (e.g., through software) and be provided as state parameters to the geometry controller. Furthermore, where the core executes multiple GS thread groups concurrently, different thread groups can have different numbers of threads and different buffer allocations. It may also be difficult to predict how long a thread group will take to execute. To ensure that each group will have space in the GS output buffer for its output data, space in the GS output buffer to store $W_{act} * N_T$ works can be allocated before each new GS thread group is launched, and launching of new GS thread groups may be delayed until enough space is available in the GS output buffer; in some embodiments, this requirement may limit the number of concurrent GS thread groups.

The scope of the invention should, therefore, be determined not with reference to the above description, but instead should be determined with reference to the appended claims along with their full scope of equivalents.

What is claimed is:

1. A multi-threaded processor for processing data, comprising:
   a core configured to execute up to a maximum number (P) of threads in parallel, wherein each thread produces up to an upper limit number ($W_{max}$) of output data words;
   an output buffer coupled to receive the output data words from the core, the output buffer having a total capacity of a number (C) of words, wherein C is less than the product of $P*W_{max}$, wherein the core is configured to write the output data to the output buffer; and
   a controller configured to determine, based on an implemented maximum number ($W_{act}$) of output data words per thread, wherein $W_{act}$ is less than or equal to $W_{max}$, a number ($N_T$) of threads to be executed in parallel by the core, wherein the product of $N_T*W_{act}$ is less than or equal to C.

2. The processor of claim 1, wherein the output buffer has a total number (B) of banks, each bank configured to store a plurality of words, wherein the core is configured to write output data words to different ones of the banks in parallel.

3. The processor of claim 2, wherein the controller is further configured to allocate a number ($N_B$) of one or more of the banks of the output buffer to each of the threads, the allocation being based at least in part on the implemented maximum number ($W_{act}$) of output data words per thread.

4. The processor of claim 3, wherein each of the threads operates on a number ($N_i$) of input vertices and produces up to a number ($N_v$) of output vertices, wherein each of the output vertices has a number ($N_a$) of attributes.

5. The processor of claim 4, wherein the numbers $N_v$ and $N_a$ are used to determine bank allocation.

6. The processor of claim 3, wherein the number ($N_B$) of banks allocated to each thread is the total number (B) of banks in the output buffer divided by $N_T$.

7. The processor of claim 6, wherein $N_T$ is selected to be the largest power of 2 for which $N_T*W_{act} \leq C$.

8. A multi-threaded processor for processing data, comprising:
   a plurality of processing engines configured to execute up to a maximum number (P) of threads in parallel, wherein each thread produces up to an upper limit number ($W_{max}$) of output data words;
   an output buffer having a total capacity of a number (C) of words, wherein C is less than the product of $P*W_{max}$;
   multiplexer logic coupled between the processing engines and the output buffer, the multiplexer logic configured to load the output buffer with output data words received from the processing engines such that all of the output data words are stored in the output buffer; and
   a controller configured to determine, based on an implemented maximum number ($W_{act}$) of output data words per thread, wherein $W_{act}$ is less than or equal to $W_{max}$, a number ($N_T$) of threads to be executed in parallel by the processing engines, wherein the product of $N_T*W_{act}$ is less than or equal to C.

9. The processor of claim 8, wherein the output buffer has a total number (B) of banks, each bank configured to store a plurality of words, wherein the multiplexer logic is further configured to write output data from different threads to a number ($N_B$) of different banks in parallel.

10. The processor of claim 9, wherein each of the threads operates on a number ($N_i$) of input vertices and produces up to a number ($N_v$) of output vertices, wherein each of the output vertices has a number ($N_a$) of attributes.

11. The processor of claim 10, wherein the numbers $N_v$ and $N_a$ are used to determine bank allocation.

12. The processor of claim 9, wherein the number ($N_B$) of banks allocated to each thread is the total number (B) of banks in the output buffer divided by $N_T$.

13. The processor of claim 12, wherein $N_T$ is selected to be the largest power of 2 for which $N_T*W_{act} \leq C$.

14. A method of processing data in a multithreaded processor having a plurality of processing engines configured to execute up to a maximum number (P) of threads in parallel, the method comprising:

receiving a plurality of threads to be executed, wherein each thread, when executed, produces a variable number up to an upper limit number ($W_{max}$) of output data words;

determining an implemented maximum number ($W_{act}$) of words expected per thread, wherein $W_{act}$ is less than or equal to $W_{max}$;

determining a number ($N_T$) of threads to be executed in parallel such that an output buffer has enough space to store all of the output data words, the output buffer having a total capacity of a number (C) of words, wherein C is less than the product of $P*W_{max}$, the number $N_T$ being determined such that the product of $N_T*W_{act}$ is less than or equal to C;

executing the number ($N_T$) of threads in parallel;

loading the output data produced by each thread into the output buffer such that all of the output data words are stored in the output buffer.

15. The method of claim 14, further comprising:

determining a number ($N_B$) of banks of the output buffer required to store $W_{act}$ words; and allocating $N_B$ banks to each thread.

16. The method of claim 15, wherein the banks allocated to each thread is determined based on a total number (B) of banks in the output buffer divided by $N_T$.

17. The method of claim 15, wherein the threads operate on a number ($N_i$) of input vertices and produce a number ($N_v$) of output vertices, wherein each of the output vertices has up to a number ($N_a$) of attributes.

18. The method of claim 17, wherein the numbers $N_v$ and $N_a$ are used to determine bank allocation.

19. The method of claim 14, wherein $N_T$ is selected to be the largest power of 2 for which $N_T*W_{act} \leq C$.

* * * * *